US012073810B2

United States Patent
Zhao

(10) Patent No.: US 12,073,810 B2
(45) Date of Patent: Aug. 27, 2024

(54) METHOD AND APPARATUS FOR IMAGE PROCESSING, METHOD AND DEVICE FOR SHARING DISPLAYED CONTENT ON A PLURALITY OF DEVICES

(71) Applicants: Beijing BOE Technology Development Co., LTD., Beijing (CN); BOE Technology Group Co., LTD., Beijing (CN)

(72) Inventor: Junjie Zhao, Beijing (CN)

(73) Assignees: BEIJING BOE TECHNOLOGY DEVELPOMENT CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 122 days.

(21) Appl. No.: 17/635,743

(22) PCT Filed: Aug. 20, 2020

(86) PCT No.: PCT/CN2020/110240
§ 371 (c)(1),
(2) Date: Feb. 16, 2022

(87) PCT Pub. No.: WO2021/032160
PCT Pub. Date: Feb. 25, 2021

(65) Prior Publication Data
US 2022/0335911 A1    Oct. 20, 2022

(30) Foreign Application Priority Data
Aug. 21, 2019   (CN) .......................... 201910775307.1

(51) Int. Cl.
G09G 5/391    (2006.01)
G09G 5/373    (2006.01)

(52) U.S. Cl.
CPC ............. *G09G 5/391* (2013.01); *G09G 5/373* (2013.01); *G09G 2340/0442* (2013.01)

(58) Field of Classification Search
CPC ................... G09G 5/391; G09G 5/373; G09G 2340/0442; G09G 2340/04; G09G 2370/02; G06F 3/1454; G06F 3/14
See application file for complete search history.

(56) References Cited

U.S. PATENT DOCUMENTS 9,030,378 B2 * 5/2015 Suzuki .................... G06F 3/147
345/2.1
2005/0259144 A1   11/2005 Eshkoli
(Continued)

FOREIGN PATENT DOCUMENTS

| CN | 102981793 A | 3/2013 |
| CN | 103700360 A | 4/2014 |

(Continued)

OTHER PUBLICATIONS

International search report of PCT application No. PCT/CN2020/110240 issued on Nov. 30, 2020.
(Continued)

*Primary Examiner* — Maurice L. McDowell, Jr.
(74) *Attorney, Agent, or Firm* — Lippes Mathias LLP

(57) ABSTRACT

Provided is an image processing method. The image processing method includes: acquiring first parameter information of a first display device; acquiring a first image currently displayed by a second display device; generating to-be-displayed content of the first display device based on the first parameter information and the first image; and displaying the to-be-displayed content by the first display device in a full screen fashion.

18 Claims, 10 Drawing Sheets

(56) References Cited

U.S. PATENT DOCUMENTS

| | | | |
|---|---|---|---|
| 2008/0172627 A1* | 7/2008 | Hagawa | G06F 3/0485 |
| | | | 715/765 |
| 2012/0096344 A1* | 4/2012 | Ho | G06F 16/9577 |
| | | | 715/249 |
| 2014/0006485 A1* | 1/2014 | Tsushima | H04L 67/01 |
| | | | 709/203 |
| 2014/0043431 A1 | 2/2014 | Kato | |
| 2014/0089823 A1* | 3/2014 | Kang | G06F 3/1446 |
| | | | 715/761 |
| 2016/0092152 A1* | 3/2016 | Portugal | G06F 3/147 |
| | | | 345/2.1 |
| 2016/0261905 A1* | 9/2016 | Aruga | G02B 27/0172 |
| 2017/0192733 A1* | 7/2017 | Huang | G06F 3/1446 |
| 2017/0372674 A1* | 12/2017 | Xie | G06V 40/172 |
| 2018/0357982 A1* | 12/2018 | Deroo | G09G 5/14 |
| 2020/0057589 A1* | 2/2020 | Jo | H04L 65/40 |

FOREIGN PATENT DOCUMENTS

| | | | | |
|---|---|---|---|---|
| CN | 105955689 A | 9/2016 | | |
| EP | 3588264 A1 | 1/2020 | | |
| JP | 2003076867 A | 3/2003 | | |
| KR | 2018109340 A | * 10/2018 | | G06F 3/041 |
| WO | 2018182296 A1 | 10/2018 | | |

OTHER PUBLICATIONS

Extended European search report of counterpart European application No. 20854572.3 issued on Mar. 9, 2023.

\* cited by examiner

METHOD AND APPARATUS FOR IMAGE PROCESSING, METHOD AND DEVICE FOR SHARING DISPLAYED CONTENT ON A PLURALITY OF DEVICES

CROSS-REFERENCE TO RELATED APPLICATION

This application is a 371 of PCT application No. PCT/CN2020/110240, filed on Aug. 20, 2020, which claims priority to Chinese Patent Application No. 201910775307.1, filed on Aug. 21, 2019, the disclosure of which are herein incorporated by reference in their entirety.

TECHNICAL FIELD

The present disclosure relates to the field of Internet technology, and in particular, relates to a method and device for processing an image, and a method and device for sharing content.

BACKGROUND

With the increase of the painting screen devices, the functions of the painting screen devices with different screen aspect ratios may not be exactly the same. A single user may have a plurality of painting screen devices. Therefore, how to share the display content of the plurality of the display devices is an urgent problem to be solved.

SUMMARY

The present disclosure provides a method and device for processing an image, and a method and device for sharing content.

According to a first aspect of embodiments of the present disclosure, a method for processing images is provided. The method includes: acquiring first parameter information of a first display device, wherein the first parameter information is configured to determine a screen aspect ratio of the first display device; acquiring a first image currently displayed by a second display device; generating to-be-displayed content of the first display device, based on the first parameter information and the first image, such that an aspect ratio of the to-be-displayed content is consistent with the screen aspect ratio; and displaying the to-be-displayed content by the first display device in a full screen fashion.

Optionally, generating the to-be-displayed content of the first display device based on the first parameter information and the first image includes: acquiring a first region parameter; extracting a second image from the first image based on the first region parameter, wherein the first region parameter is configured to determine a position of content of the second image in the first image; and acquiring the to-be-displayed content by processing the second image based on the first parameter information.

Optionally, generating the to-be-displayed content of the first display device based on the first parameter information and the first image includes: determining a region of interest in the first image in response to a select operation on the first image; acquiring a third image by extracting the region of interest from the first image; and acquiring the to-be-displayed content by processing the third image based on the first parameter information.

Optionally, the to-be-displayed content includes at least part of the first image.

Optionally, the to-be-displayed content is the first image or part of the first image; and generating the to-be-displayed content of the first display device based on the first parameter information and the first image includes: determining the first image as the to-be-displayed content, in the case that the aspect ratio of the first image is consistent with the screen aspect ratio; and cropping a part content from the first image as the to-be-displayed content, in the case that the aspect ratio of the first image is inconsistent with the screen aspect ratio, such that the aspect ratio of the to-be-displayed content is consistent with the screen aspect ratio.

Optionally, the to-be-displayed content further includes additional display content associated with the content of the first image, and an aspect ratio of a display region of the to-be-displayed content is consistent with the screen aspect ratio.

Optionally, generating the to-be-displayed content of the first display device based on the first parameter information and the first image includes: acquiring a fourth image by extracting at least part of the first image; acquiring the additional display content based on the first parameter information and content of the fourth image; and acquiring the to-be-displayed content by merging the fourth image with the additional display content.

Optionally, acquiring the additional display content based on the first parameter information and the content of the fourth image includes: acquiring a user identifier of the first display device; determining a target user portrait based on the user identifier and a corresponding relationship between the user identifier and a user portrait; and acquiring the additional display content based on the first parameter information, the target user portrait, and the fourth image.

Optionally, acquiring the additional display content based on the first parameter information and the content of the fourth image includes: acquiring content information of the fourth image by parsing the fourth image; acquiring information of specified attributes of the fourth image based on the content information; and acquiring the additional display content by processing the information of the specified attributes based on the first parameter information.

Optionally, the additional display content includes: image content or text content.

Optionally, the first parameter information is the screen aspect ratio or a screen resolution of the first display device.

According to a second aspect of embodiments of the disclosure, a method for sharing content is provided. The method is applicable to a second display device. The method includes: acquiring first parameter information of a first display device, wherein the first parameter information is configured to determine a screen aspect ratio of the first display device; generating to-be-displayed content of the first display device based on the first parameter information and a first image currently displayed by a second display device, such that an aspect ratio of the to-be-displayed content is consistent with the screen aspect ratio; and sending the to-be-displayed content to the first display device, such that the first display device displays the to-be-displayed content in a full screen fashion.

Optionally, the method further includes establishing a communication connection to the first display device.

Optionally, establishing the communication connection to the first display device includes: establishing a direct communication to the first display device using a Universal Plug and Play communication protocol or a Bluetooth communication protocol, in the case that the first display device is detected.

Optionally, acquiring the first parameter information of the first display device includes: sending a first request to the first display device, wherein the first request is configured to acquire a second parameter information, the second parameter information including the first parameter information; receiving first feedback information from the first display device in response to the first request, wherein the first feedback information includes the second parameter information; and acquiring the first parameter information based on the second parameter information.

According to a third aspect of embodiments of the present disclosure, a method for sharing content is provided. The method is applicable to a server. The method includes: acquiring first parameter information of a first display device, wherein the first parameter information is configured to determine a screen aspect ratio of the first display device; acquiring a first image currently displayed by a second display device; generating to-be-displayed content of the first display device based on the first parameter information and the first image, such that an aspect ratio of the to-be-displayed content is consistent with the screen aspect ratio; and controlling the first display device to display the to-be-displayed content in a full screen fashion.

Optionally, the method further includes establishing a communication connection between the first display device and the second display device.

Optionally, establishing the communication connection between the first display device and the second display device includes: receiving a first register request from the first display device, wherein the first register request includes a first device identifier of the first display device; registering the first display device in response to the first register request and sending second feedback information to the first display device, wherein the second feedback information includes a first registration result; receiving a second register request from the second display device, wherein the second register request includes a second device identifier of the second display device; and registering the second display device in response to the second register request, and sending third feedback information to the second display device, wherein the third feedback information includes a second registration result, and the first display device and the second display device are capable of communicating with each other via the server in the case that the first display device and the second display device are successfully registered with the server.

Optionally, upon establishing the communication connection between the first display device and the second display device, the method further includes: receiving a first create request from the first display device, wherein the first create request includes the first device identifier and second parameter information of the first display device, and the second parameter information includes the first parameter information; and associating the first device identifier with the second parameter information and storing the first device identifier and the second parameter information in response to receiving the first create request.

Optionally, acquiring the first parameter information of the first display device includes: receiving a content create request from the second display device, wherein the content create request is configured to request to share the first image with the first display device, and the content create request including the first device identifier of the first display device; and acquiring the second parameter information based on the first device identifier and acquiring the first parameter information based on the second parameter information.

According to a fourth aspect of embodiments of the present disclosure, a device for processing images is provided. The device includes a processor and a memory; wherein the memory is configured to store a computer program; and the processor is configured to run the computer program stored in the memory to perform the method according to the first aspect.

According to a sixth aspect of embodiments of the present disclosure, a terminal device is provided. The terminal device includes a processor and a memory; wherein the memory is configured to store a computer program; and the processor is configured to run the computer program stored in the memory to perform the method according to the second aspect.

According to an eighth aspect of the embodiments of the present disclosure, provided is an electronic device including a processor and a memory, wherein the memory is configured to store a computer program; and the processor is configured to run the computer program stored in the memory to perform the method according to the third aspect.

It should be understood that both the foregoing general description and the following detailed description are only exemplary and explanatory, and cannot limit the present disclosure.

BRIEF DESCRIPTION OF THE DRAWINGS

The drawings herein are incorporated into and constitute a part of the description, show the embodiments consistent with the disclosure, and together with the description are used to explain the principles of the disclosure.

DETAILED DESCRIPTION

The exemplary embodiments are described in detail herein, and examples thereof are shown in the accompanying drawings. In the case that the following description refers to the drawings, unless otherwise indicated, the same numbers in different drawings indicate the same or similar elements. The embodiments described hereinafter do not represent all embodiments consistent with the present disclosure. Otherwise, these embodiments are merely examples of devices and methods consistent with some aspects of the present disclosure as detailed in the appended claims.

Figure 1:
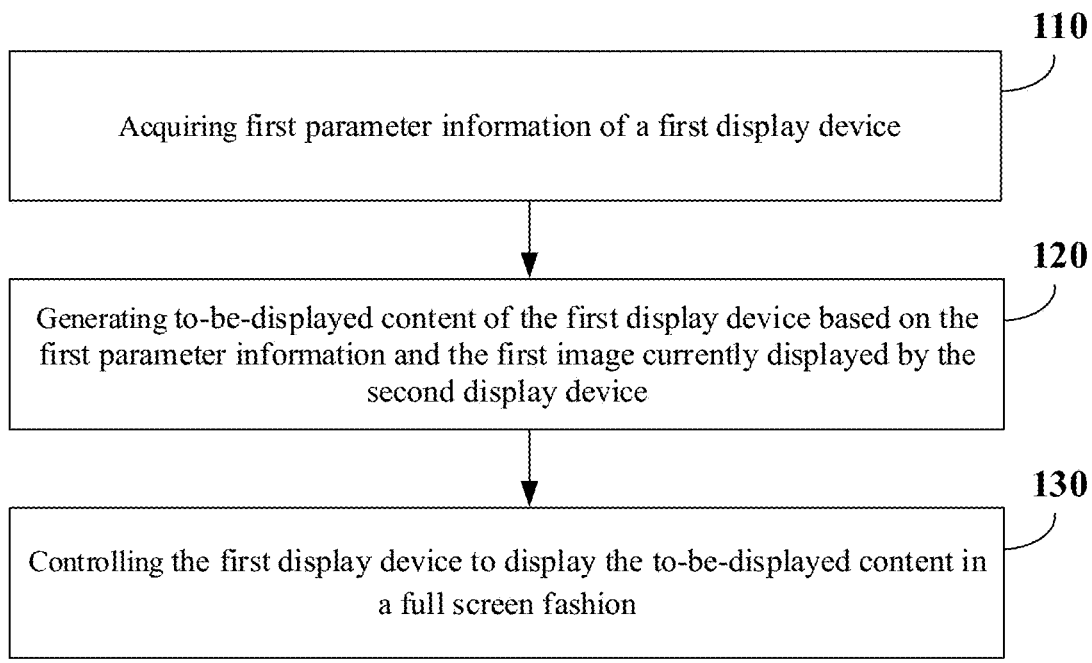
FIG. 1 is a flowchart of a method for sharing content according to an embodiment of the present disclosure.

An embodiment of the present disclosure provides a method for sharing content. The method is applicable to a second display device and a first display device which are communicably connected. The second display device and the first display device may be painting screen devices. The painting screen device may be configured to display an image, such as a picture, a photo, or the like. As shown in FIG. 1, the method may include the following steps 110 to 130.

In step 110, first parameter information of the first display device is acquired.

Exemplarily, the first parameter information may be configured to determine a screen aspect ratio of the first display device.

In step 120, to-be-displayed content of the first display device is generated based on the first parameter information and a first image currently displayed by the second display device, wherein the first image currently displayed by the second display device needs to be acquired prior to performing step 120.

Exemplarily, an aspect ratio of the generated to-be-displayed content is consistent with the screen aspect ratio of the first display device.

In step 130, the first display device is controlled to display the to-be-displayed content in a full screen fashion.

According to the embodiments as described above, the to-be-displayed content of the first display device is acquired based on the first parameter information of the first display device by acquiring the first parameter information of the first display device, such that the first display device displays the to-be-displayed content in a full screen fashion. In this way, the display content may be shared between display devices, display space waste may be avoided, the utilization rate of the display space may be improved, and the display effect may be improved.

Figure 2:
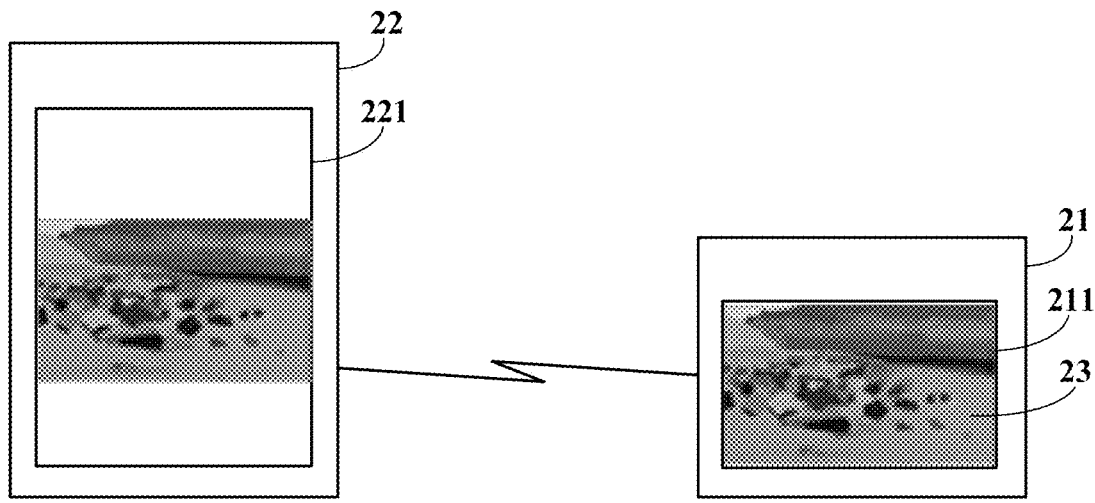
FIG. 2 is an application scenario diagram according to an embodiment of the present disclosure.

In an exemplary scenario, as shown in FIG. 2, in the case that the user needs to share a first image 23 currently displayed on a second display device 21 to a first display device 22 for display, a first screen aspect ratio of a first screen 211 of the second display device 21 is different with a second screen aspect ratio of a second screen 221 of the first screen 22. In the case that the first screen 211 of the second display device 21 displays the first image 23 in a full screen fashion, without any processing on the first image 23, the first display device 22 cannot display the entire first image 23 in a full screen fashion, either the display interface is blank, or the display interface only displays part of the first image 23.

For better display, by the first display device 22, of the entirety or part of the first image 23 currently displayed on the second display device in a full screen fashion, the first parameter information of the first display device is acquired, and the to-be-displayed content on the first display device 22 is acquired based on the first parameter information and the first image 23 currently displayed by the second display device 21, such that the first display device 22 displays the aforementioned to-be-displayed content in a full screen fashion, wherein the first parameter information may include the second screen aspect ratio of the second screen 221 of the first display device 22. The to-be-displayed content includes at least part of the first image. For example, the to-be-displayed content includes part or entirety of the first image 23.

It should be noted that steps 110 to 130 may be performed by the second display device 21, and may also be performed by the first display device 22, and in the case that the second display device 21 is communicably connected to the first display device 22 via the server, steps 110 to 130 may be performed by the server. Steps 110 to 130 may also be performed by the user terminal in the case that both the first display device 21 and the first display device 22 are capable of communicating with a user terminal.

In this embodiment, the to-be-displayed content of the first display device is generated by acquiring the first parameter information of the first display device and based on the first parameter information and the currently displayed first image by the second display device, such that the first display device displays the to-be-displayed content in a full screen fashion. In this way, the display content may be shared between display devices, the waste of display space may be avoided, the utilization rate of the display space may be improved, and the display effect may be improved.

Figure 3:
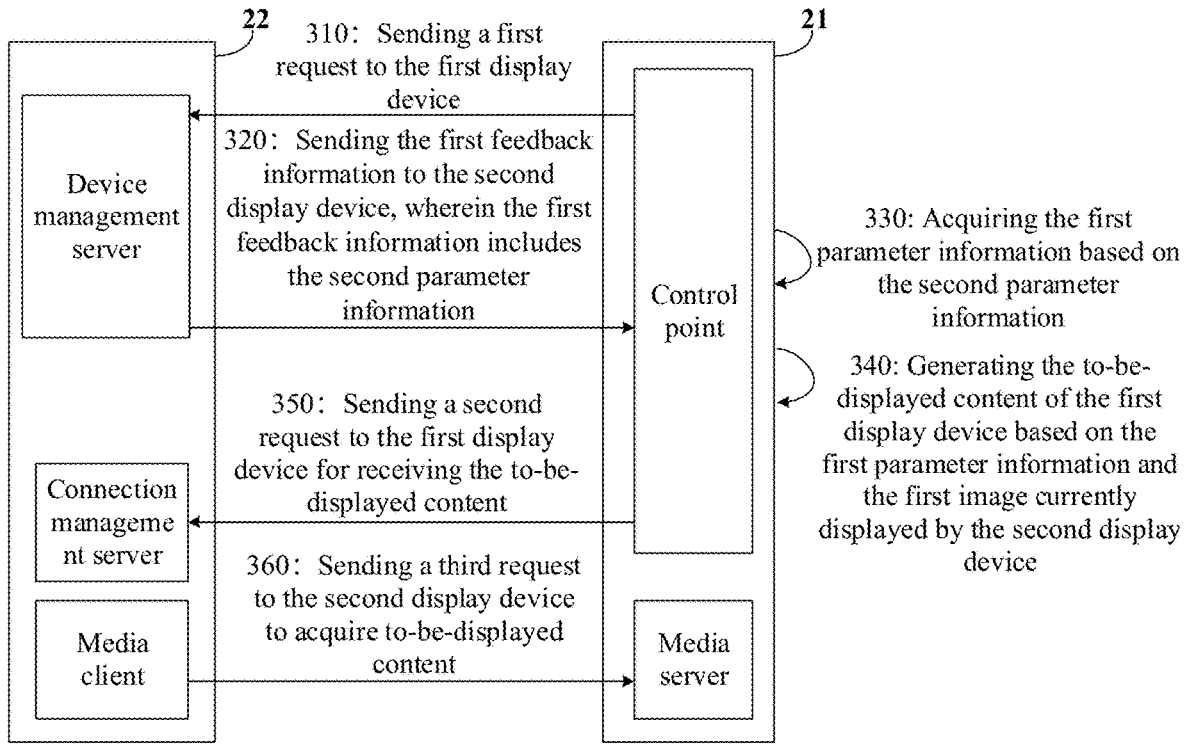
FIG. 3 is a flowchart of another method for sharing content according to an embodiment of the present disclosure.

An embodiment of the present disclosure provides another method for sharing content. In this embodiment, as shown in FIG. 3, the second display device 21 and the first display device 22 may be communicably connected. The second display device 21 may detect the first display device 22 using a Universal Plug and Play (UPnP) communication protocol or a Bluetooth communication protocol and establish a communication connection to the first display device 22. For example, in the case that the first display device 22 using the UPnP communication protocol or the Bluetooth communication protocol is detected, the direct communication may be established between the second display device 21 and the first display device 22. In this embodiment, description is given by taking the communication between the second display device 21 and the first display device 22 using the UPnP communication protocol as an example.

The UPnP communication protocol defines a standard for the content transmission between devices. The content transmission involves: a control point (CP), a source device and a target device, wherein the control point communicates with the source device and the target device, the source device communicates with the target device, and the source device may be a control point at the same time. The source device and the target device are configured to implement UPnP services according to their needs. UPnP services may include device management services, content management services, connection management services, and the like. The control point may control the device and transmit the content between the devices by requesting the services included in the device.

In an embodiment of the present disclosure, the second display device 21 may be configured to be the source device and the control point, and the first display device 22 may be configured to be the target device. The control point and the target device operate via the UPnP service interface. The second display device 21 implements CP functions and media server functions, and the first display device 22 implements UPnP services, such as device management services, connection management services, and media clients.

As shown in FIG. 3, in an embodiment of the present disclosure, the method may include the following steps 310 to 360.

In step 310, the second display device sends a first request to the first display device, wherein the first request is configured to acquire the second parameter information; and the second parameter information includes the first parameter information.

In an embodiment of the present disclosure, the second parameter information may include a first display resolution of the first display device, and the first parameter information includes a second screen aspect ratio of the second screen 221 of the first display device, wherein the first display resolution may be configured to calculate a second screen aspect ratio, and the second parameter information may also include a second screen aspect ratio of the second screen 221 of the first display device.

In step 320, the first display device sends the first feedback information to the second display device, wherein the first feedback information includes the second parameter information.

In step 330, the second display device acquires the first parameter information based on the second parameter information.

In an embodiment of the present disclosure, the second display device may calculate the second screen aspect ratio based on the first display resolution.

In step 340, the second display device may generate the to-be-displayed content of the first display device based on the first parameter information and the first image currently displayed by the second display device. In an embodiment of the present disclosure, in the case that the aspect ratio of the first image is not consistent with the aspect ratio of the second screen, the to-be-displayed content may be part of the first image 23. For example, the to-be-displayed content may be part of the content extracted from the first image 23, and the aspect ratio of the to-be-displayed content is identical to the second screen aspect ratio of the second screen 221 of the first display device 22. For example, the to-be-displayed content is a part content cropped out of the first image 23. In the case that the aspect ratio of the first image is consistent with the second screen aspect ratio, the first image 23 may be the to-be-displayed content. As such, the first display device 22 may display the to-be-displayed content in a full screen fashion.

Figure 4:
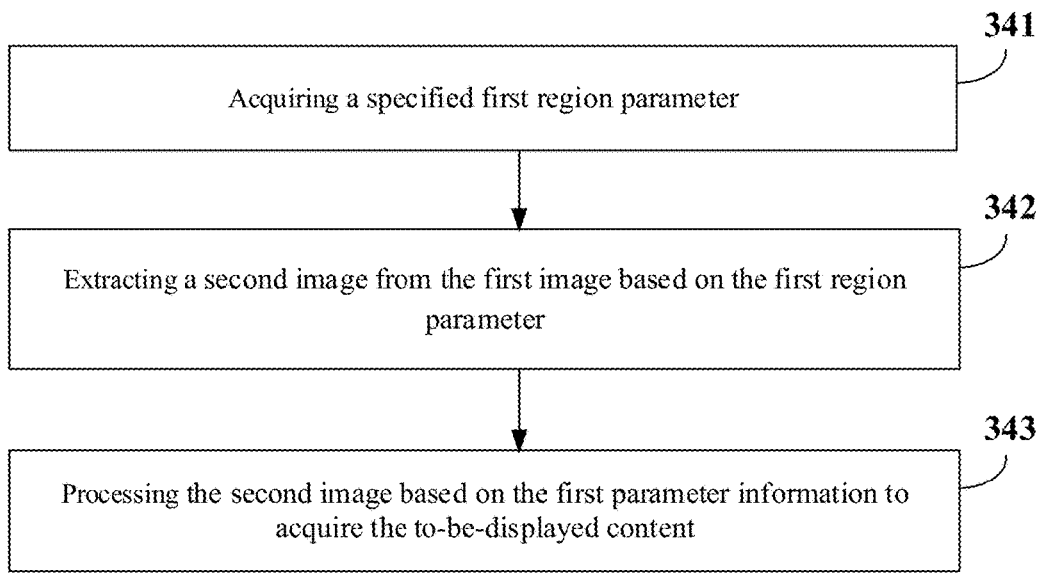
FIG. 4 is a flowchart of still another method for sharing content according to an embodiment of the present disclosure.

In an embodiment of the present disclosure, as shown in FIG. 4, step 340 may include the following steps 341 to 343.

In step 341, a specified first region parameter is acquired.

In step 342, a second image is extracted from the first image based on the first region parameter, wherein the first region parameter is configured to determine a position of the content of the second image in the first image.

In step 343, the second image is processed based on the first parameter information to acquire the to-be-displayed content.

In an embodiment of the present disclosure, the first region parameter may be pre-stored in the second display device or may be defined by the user. The first region parameter may include the four vertices of the content of the second image in the first image, which is not limited to this.

In an embodiment of the present disclosure, the second display device may extract the second image from the first image based on the first region parameter and compare a third aspect ratio of the second image to the second screen aspect ratio of the second screen 221 of the first display device 22, and in the case that the third aspect ratio is identical to the second screen aspect ratio, the second image may be sent as the to-be-displayed content to the first display device 22 to make the first display device 22 display the to-be-displayed content in a full screen fashion. In the case that the third aspect ratio is different from the second screen aspect ratio, the second image is processed based on the first parameter information to acquire the to-be-displayed content, wherein the aspect ratio of the to-be-displayed content is identical to the second screen aspect ratio, such that the first display device displays the to-be-displayed content in a full screen fashion.

In step 350, the second display device sends a second request for receiving to-be-displayed content to the first display device. The second request is configured to request the first display device 22 to prepare to receive the to-be-displayed content.

In step 360, the first display device sends a third request to the second display device to acquire the to-be-displayed content.

In an embodiment of the present disclosure, the second display device 21 may send the to-be-displayed content to the first display device 22 for display in response to the third request. The third request may be, for example, an HTTP PULL request.

In an embodiment of the present disclosure, the second image may be extracted from the first image 23 based on the specified first region parameter, and the second image may be processed based on the first parameter information to acquire the to-be-displayed content, which simplifies the user operation.

Figure 5:
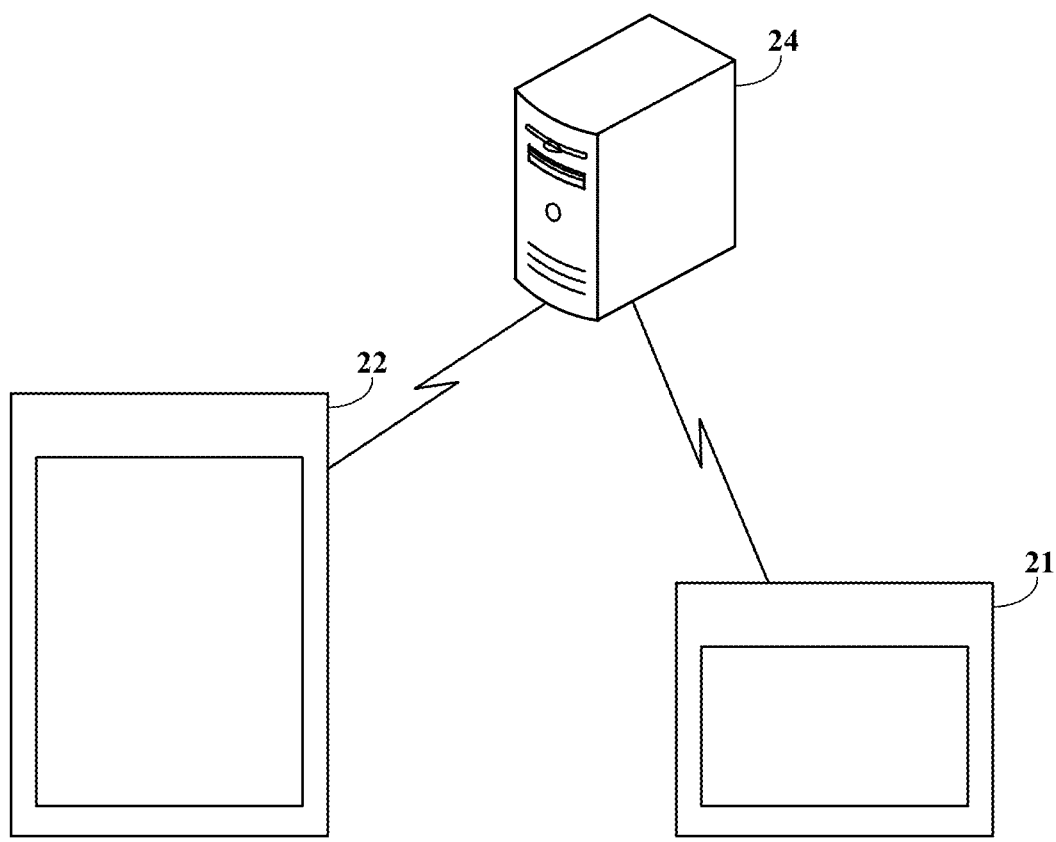
FIG. 5 is another application scenario diagram according to an embodiment of the present disclosure.

An embodiment of the present disclosure provides another method for sharing content. In this embodiment, as shown in FIG. 5, the second display device 21 and the first display device 22 may communicate with each other via a server 24, wherein the server 24 may be a cloud server to provide a content sharing service for the second display device 21 and the first display device 22. Exemplarily, the second display device 21 is configured to be a source display device, and the first display device 22 is configured to be a target display device.

Figure 6:
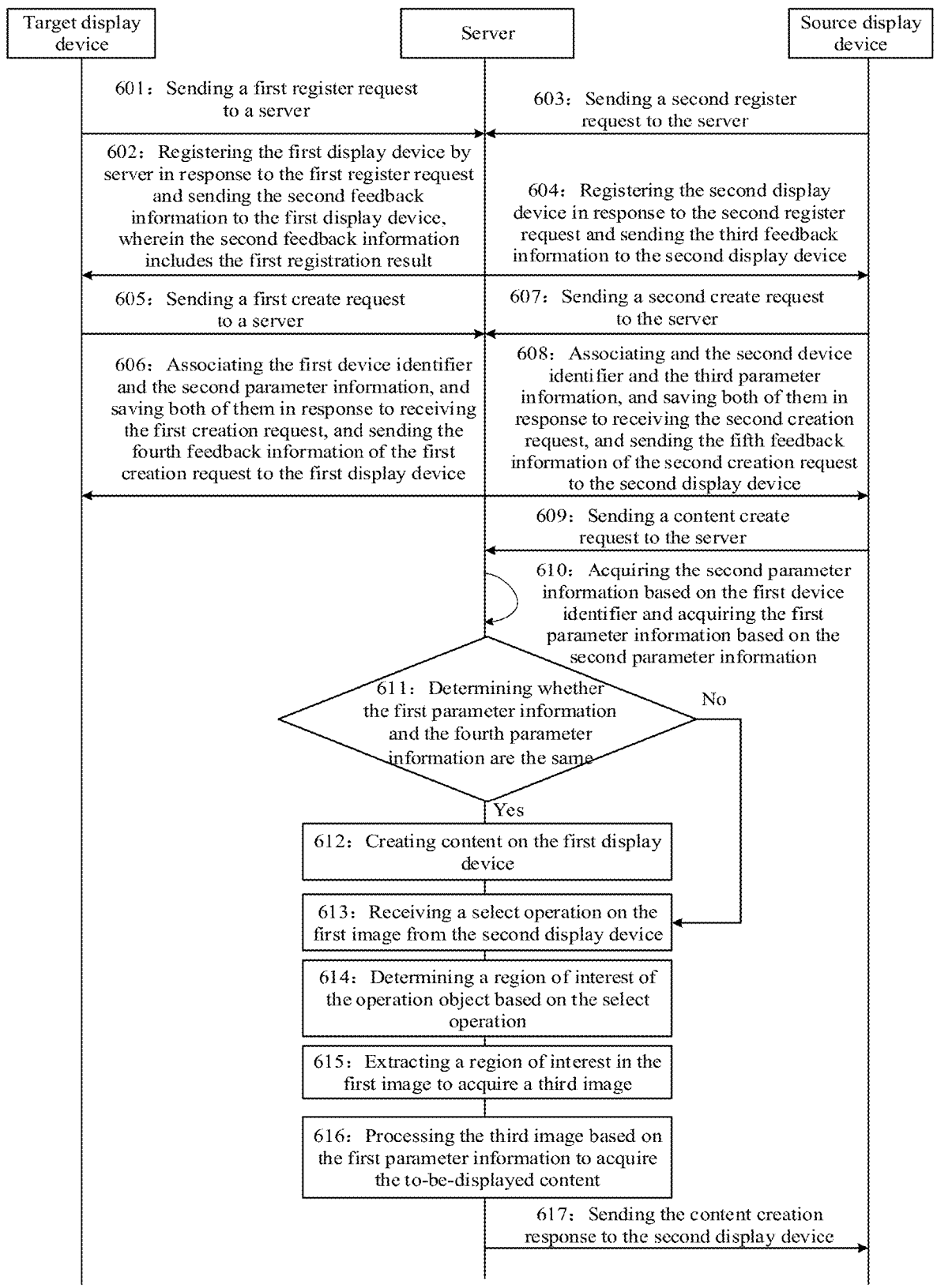
FIG. 6 is a flowchart of yet still another method for sharing content according to an embodiment of the present disclosure.

In an embodiment of the present disclosure, the method, as shown in FIG. 6, may include the following steps 601 to 617.

In step 601, the first display device sends a first register request to a server, wherein the first register request includes a first device identifier of the first display device.

In step 602, the server registers the first display device in response to the first register request and sends second feedback information to the first display device, wherein the second feedback information includes the first registration result, and the first registration result includes information about the success or failure of the registration.

In step 603, the second display device sends a second register request to the server, wherein the second register request includes a second device identifier of the second display device.

In step 604, the server registers the second display device in response to the second register request and sends third feedback information to the second display device, wherein the third feedback information includes the second registration result, the second registration result includes information about the success or failure of the registration, and the functionality of content sharing may be implemented, in the case that the first display device and the second display device are both registered with the server.

In step 605, the first display device sends a first create request to the server, wherein the first create request includes a first device identifier and second parameter information of the first display device. The second parameter information includes the first parameter information.

In an embodiment of the present disclosure, the second parameter information may be a first display resolution, and the first parameter information may be a second screen aspect ratio. The server may calculate a second screen aspect ratio of the second screen 221 of the first display device 22 based on the first display resolution.

In step 606, the server associates the first device identifier with the second parameter information and stores both the first device identifier and the second parameter information in response to receiving the first creation request, and sends fourth feedback information of the first creation request to the first display device, wherein the fourth feedback information includes information about the success or failure of the creation.

In step 607, the second display device sends a second create request to the server, wherein the second create request includes the second device identifier of the second display device and third parameter information. The third parameter information includes fourth parameter information of the second display device.

In an embodiment of the present disclosure, the third parameter information may be a second display resolution of the second display device. The fourth parameter information is a first screen aspect ratio of the first screen of the second display device. The server may calculate a first screen aspect ratio of the first screen of the second display device based on the second display resolution.

In step 608, the server associates the second device identifier with the third parameter information and stores both the second device identifier and the third parameter information in response to receiving the second creation request, and sends the fifth feedback information of the second creation request to the second display device. The fifth feedback information includes information about the success or failure of the creation.

In step 609, the second display device sends a content create request to the server. The content create request is configured to request the server to share the first image to the first display device. The content create request includes a first device identifier of the first display device.

In step 610, the server acquires the second parameter information based on the first device identifier and acquires the first parameter information based on the second parameter information.

In step 611, the server determines whether the first parameter information is identical to the fourth parameter information. If identical, the process proceeds to step 612; and otherwise, the process proceeds to step 613.

In step 612, the server creates content on the first display device. In this embodiment, the server acquires the first image currently displayed by the second display device and sends it to the first display device for display. The first display device may display the entire first image in a full screen fashion.

In step 613, the server receives a select operation on the first image from the second display device, wherein the select operation is configured to select the region of interest of the operation object in the first image, and the select operation is, for example, a predetermined operation of the operation object (such as a user) on the first image.

In an optional embodiment, the select operation may be a non-enclosed slide operation.

Figure 7:
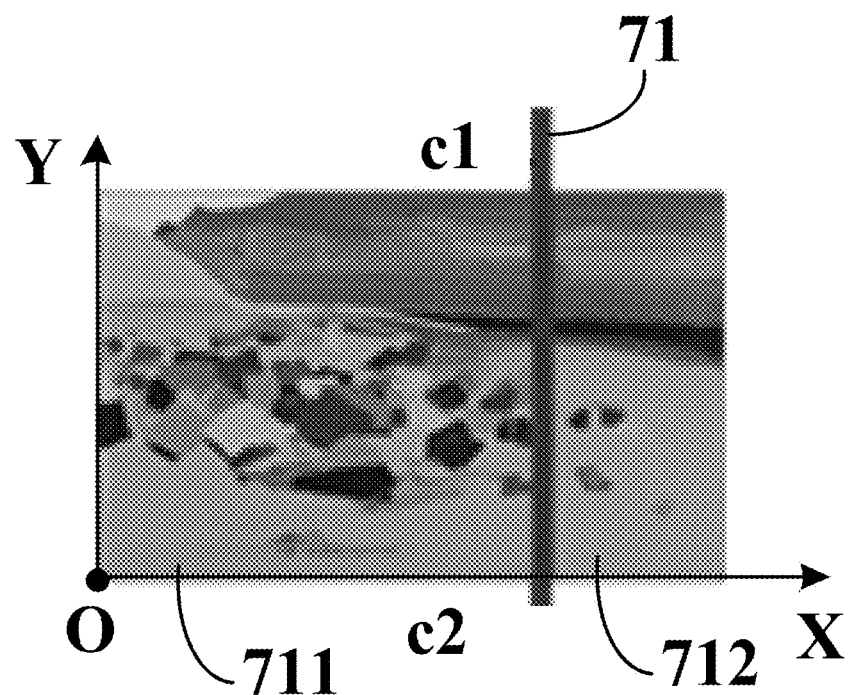
FIG. 7 is a schematic diagram illustrating a select operation according to an embodiment of the present disclosure.

In an optional embodiment, as shown in FIG. 7, only one non-enclosed slide operation is configured. A slide operation 71 may extend from a first side c1 to a second side c2 of the first image, and divide the first image into two regions: a first region 711 and a second region 712, wherein an area of the first region 711 is greater than an area of the second region 712, and the first side c1 is opposite to the second side c2. The first region 711 may be used as a region of interest of the operation object.

Figure 8:
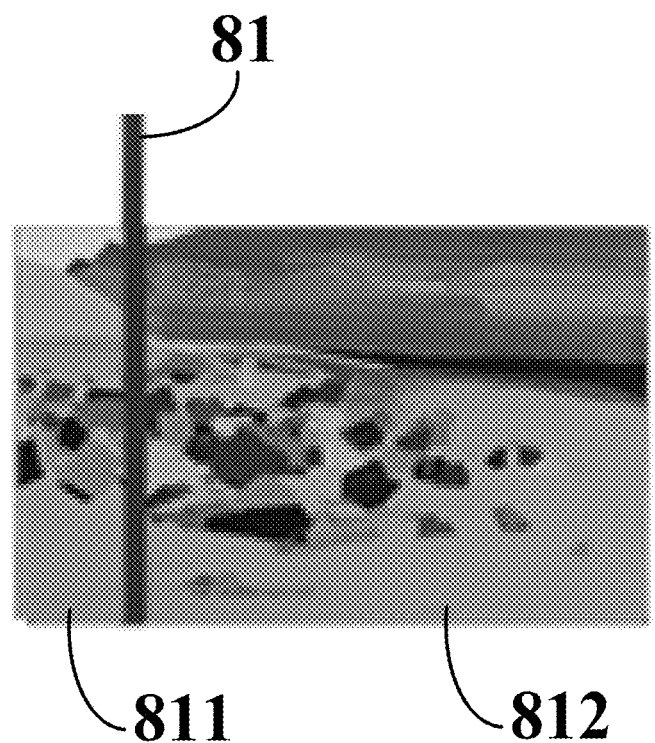
FIG. 8 is a schematic diagram illustrating another select operation according to an embodiment of the present disclosure.

In an optional embodiment, as shown in FIG. 8, only one non-enclosed slide operation is configured. The slide operation 81 may divide the first image into two regions: a third region 811 and a fourth region 812, wherein an area of the fourth region 812 is greater than an area of the third region 811. The fourth region 812 may be used as a region of interest of the operation object.

Figure 9:
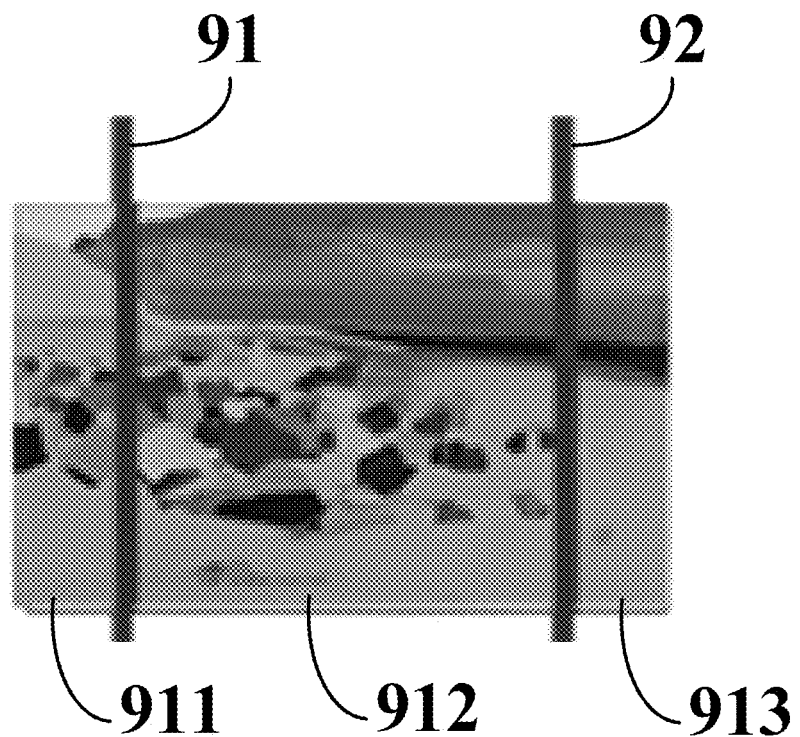
FIG. 9 is a schematic diagram illustrating still another select operation according to an embodiment of the present disclosure.

In an optional embodiment, the number of non-enclosed slide operations shown in FIG. 9 may also be two. The slide operations 91 and 92 may divide the first image into three regions: a fifth region 911, a sixth region 912, and a seventh region 913, wherein an area of the sixth region 912 between the slide operations 91 and 92 is greater than an area of the fifth region 911, and is also greater than an area of the seventh region 913. The sixth region 912 may be used as a region of interest for the operation object.

Figure 10:
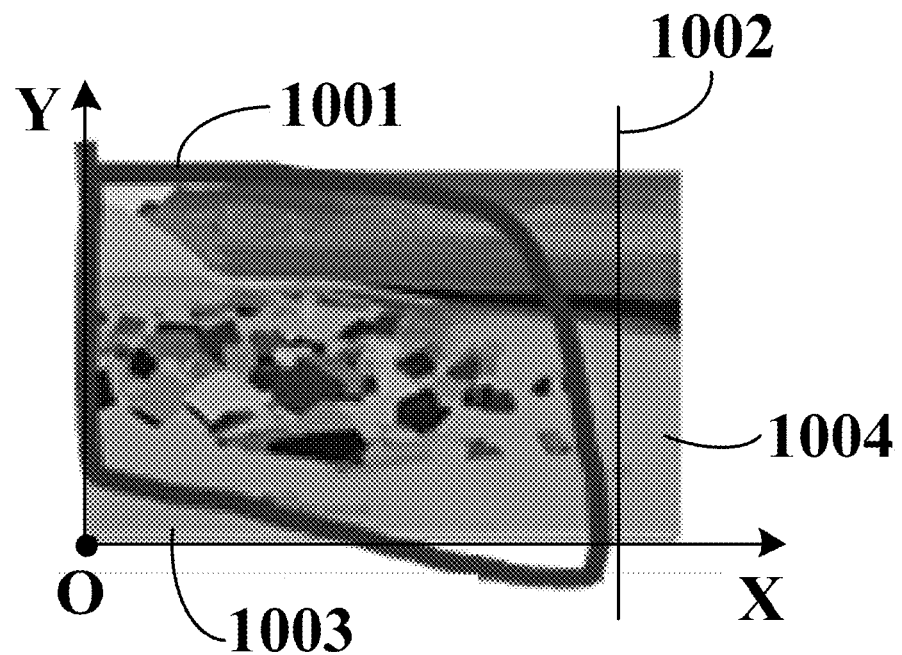
FIG. 10 is a schematic diagram illustrating yet still another select operation according to an embodiment of the present disclosure.

In an optional embodiment, as shown in FIG. 10, the select operation may be an enclosed slide operation 1001. A region circled by the slide operation 1001 is the region of interest of the operation object.

In step 614, a region of interest of the operation object is determined based on the select operation.

In an embodiment of the present disclosure, the region of interest of the operation object may be determined based on the location information of the select operation. In the embodiment shown in FIG. 7, a vertex O in the lower left corner of the first image may be used as a coordinate origin, a coordinate axis extending along the lower edge of the first image may be taken as an X-axis, a coordinate axis extending along the left side of the first image may be taken as a Y-axis, the slide operation 71 is substantially parallel to the Y-axis, and the position information of the slide operation 71 includes coordinates of the slide operation 71 in the X-axis direction, for example, the coordinates of the slide operation 71 are ⅔. The first region 711 may be determined as a region of interest of the operation object based on the coordinates of the slide operation 71.

In the embodiment shown in FIG. 8, the coordinate of the slide operation 81 is ¼. The fourth region 812 may be determined as a region of interest of the operation object based on the coordinates of the slide operation 81.

In the embodiment shown in FIG. 9, the coordinates of the slide operation 91 are ⅙, and the coordinates of the slide operation 92 are ⅚. Based on the coordinate of the slide operation 91, the coordinates of the slide operation 92 may determine that the sixth region 912 is a region of interest of the operation object.

In the embodiment shown in FIG. 10, the location information of the select operation 1001 may be a set of coordinates of the pixel points covered by the select operation.

Based on the location information of the select operation 1001, it may be determined that the region circled by the slide operation 1001 is a region of interest of the operation object.

In the embodiment shown in FIG. 10, in the case that a circumscribed circle is present in the select operation 1001, the circumscribed circle of the select operation 1001 may be determined based on the location information of the select operation 1001, then a tangent line 1002 of the circumscribed circle is determined, wherein the tangent line 1002 is parallel to the Y axis, the tangent line 1002 divides the current display content into an eighth region 1003 and a ninth region 1004, and the eighth region 1003 includes the region circled in the select operation 1001 to be the region of interest of the operation object. In the case that no circumscribed circle is present in the select operation 1001, a minimum bounding rectangle of the select operation 1001 may be determined based on the location information of the select operation 1001, and an edge 1002 of the minimum bounding rectangle is determined, wherein the edge 1002 is parallel to the Y axis, the edge 1002 divides the current display content into an eighth region 1003 and a ninth region 1004, and the eighth region 1003 includes the region circled in the select operation 1001 to be the region of interest of the operation object.

In step 615, a region of interest in the first image is extracted to acquire a third image.

In the embodiment shown in FIG. 7, the first region 711 on the left side of the slide operation 71 is extracted to acquire a third image.

In the embodiment shown in FIG. 8, the fourth region 812 on the right side of the slide operation 81 is extracted to acquire a third image.

In the embodiment shown in FIG. 9, the sixth region 912 between the slide operation 91 and the slide operation 92 is extracted to acquire a third image.

In the embodiment shown in FIG. 10, the eighth region 1003 may be extracted to acquire a third image.

In step 616, the server processes the third image based on the first parameter information to acquire the to-be-displayed content.

In this disclosure, the first display parameter is a second screen aspect ratio of the second screen 221 of the first display device 22. After the server processes the first reference display content (for example, the third image) based on the second screen aspect ratio, the fourth aspect ratio of the to-be-displayed content is identical to the second screen aspect ratio.

In step 617, the content creation response is sent to the second display device.

In an embodiment of the present disclosure, the server may send the content creation response to the second display device after the to-be-displayed content is sent to the first display device for display.

In an embodiment of the present disclosure, the to-be-displayed content on the first display device is determined based on the select operation of the first image of the second display device from the operation object, which avoids omitting the information in the region of interest of the operation object. Moreover, the third image extracted from the first image currently displayed on the second display device is processed based on the first parameter information of the first display device to acquire the to-be-displayed content, such that the first display device displays the to-be-displayed content in a full screen fashion, which avoids the waste of display space, improves the utilization rate of the display space, and improves the display effect.

An embodiment of the present disclosure provides another method for sharing content. In this embodiment, the to-be-displayed content may include part or entirety of the first image and additional display content associated with the content of the first image. The additional display content is an image. The aspect ratio of the display region of the to-be-displayed content is consistent with the second screen aspect ratio of the second screen 221 of the first display device 22.

Figure 11:
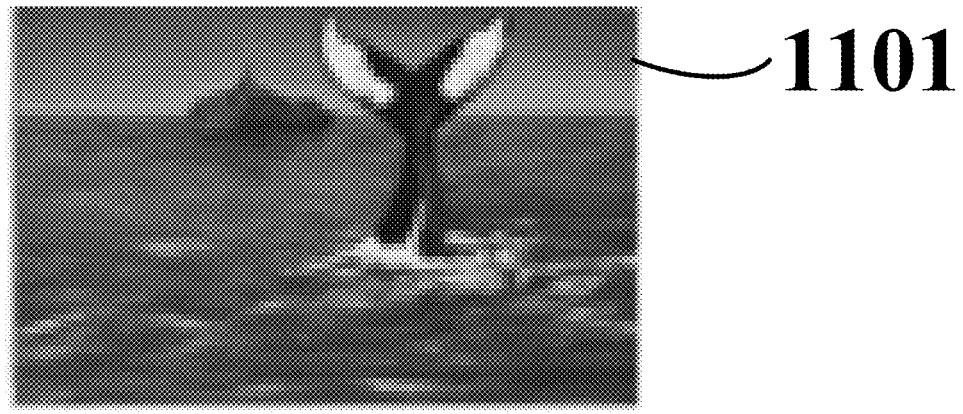
FIG. 11 is a schematic diagram illustrating a first image according to an embodiment of the present disclosure.
Figure 12:
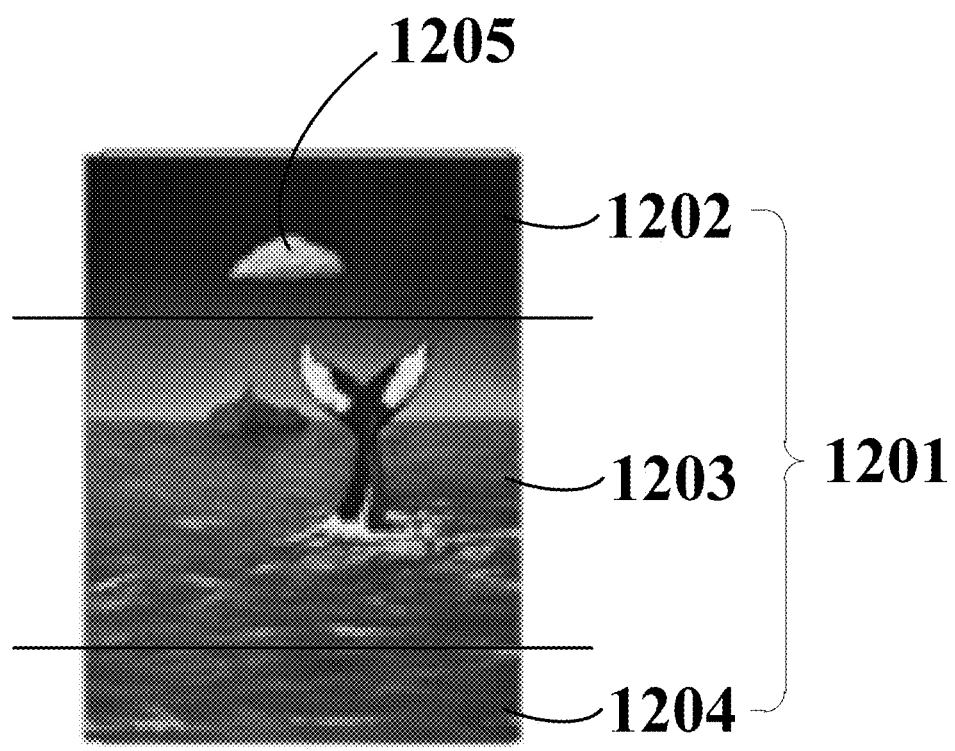
FIG. 12 is a diagram illustrating to-be-displayed content according to an embodiment of the present disclosure.

In an optional embodiment, the first image is the image 1101 as shown in FIG. 11, the to-be-displayed content is the image 1201 as shown in FIG. 12, wherein the image 1201 includes the first image region 1202, the second image region 1203, and the third image region 1204, the content in the second image region 1203 is identical to the content in the image 1101 and the first image region 1202, the third image region 1204 are additional display content, and the content of the first image region 1202, and the third image region 1204 are associated with the content of the image 1101.

Figure 13:
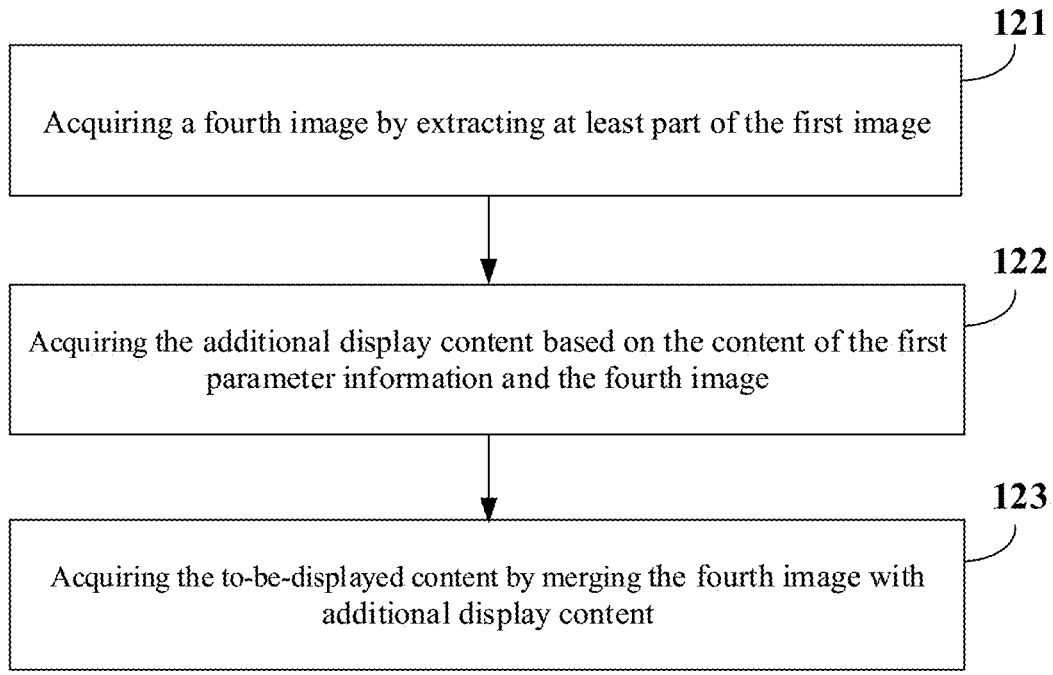
FIG. 13 is a flowchart illustrating another method for sharing content according to embodiments of the present disclosure.

In an embodiment of the present disclosure, as shown in FIG. 13, step 120 described above may include the following steps 121 to 123.

In step 121, at least part of the first image is extracted to acquire a fourth image.

In this embodiment, at least part of the first image may be extracted, based on the specified second region parameter or the operation selection of the first image, by the operation object to acquire a fourth image. The second region parameter may be pre-stored in the second display device (or a server) or may be defined by the user. In the case that the to-be-displayed content includes part of the first image, the second region parameter may be a coordinate of the content of the fourth image in the first image, and the fourth image may also include the entire first image.

In step 122, the additional display content is acquired based on the content of the first parameter information and the fourth image.

In step 123, the to-be-displayed content is acquired by merging the fourth image with the additional display content.

In an embodiment of the present disclosure, in the case that the to-be-displayed content includes the entire first image, the fourth image may be the content of the image 1101. The content elements of the image 1101 may be acquired by parsing the image 1101. The content elements may include the sea, the sky, dolphins, icebergs, and the like. Then, the fourth image is edited based on the content element to acquire the additional display content: the first image region 1202 and the third image region 1204. The content of the first image region 1202 is the sky, and the content of the third image region 1204 is the sea.

In an optional embodiment, a user identifier of the first display device 22 may also be acquired, a target user portrait may be determined based on the user identifier and the corresponding relationship between the user ID and the user portrait, and the additional display content may be acquired based on the first parameter information, the target user portrait and the fourth image. The second display device or server may have pre-stored the corresponding relationship between the user identifier and the user portrait. The user portrait may include the favorite content elements, themes, styles, categories, and other information of the user. In this embodiment, the target user portrait may be determined based on the user identifier and a corresponding relationship between the user identifier and the user portrait, then the content element to be added is determined from the target user portrait, and the fourth image is edited based on the content element to be added and the first parameter information to acquire the additional display content. For example, in the case that the user's preference for white clouds in the seascape sky is greater than seagulls in the target user portrait, white clouds 1205 may be added to the content of the first image region 1202. Then, the to-be-displayed content is acquired by combining the first image region 1202, the second image region 1203, and the third image region 1204.

In an embodiment of the present disclosure, the fourth image and the additional display content are processed based on the second screen aspect ratio of the second screen 221 of the first display device 22 to acquire the to-be-displayed content, and the aspect ratio of the display region of the to-be-displayed content is identical to the aspect ratio of the second screen.

In an embodiment of the present disclosure, at least part of the first image is extracted to acquire a fourth image, the additional display content is acquired based on the content of the first parameter information and the fourth image, and the to-be-displayed content is acquired by combining the fourth image with the additional display content. In this way, the first display device displays in a full screen fashion by adding additional display content.

Further, in the case that the to-be-displayed content includes the entire first image and the additional display content, not only the first display device may be configured to display in a full screen fashion, but also the loss of information may be reduced.

An embodiment of the present disclosure provides another method for sharing content. In this embodiment, the to-be-displayed content includes the entire first image and additional display content, wherein the additional display content is textual content.

Figure 14:
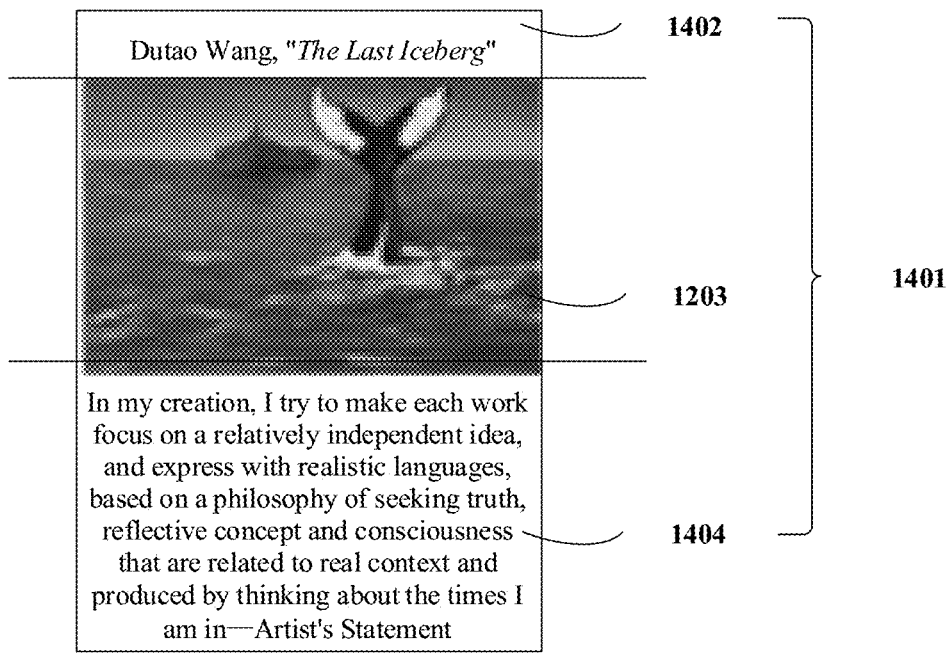
FIG. 14 is a schematic diagram illustrating to-be-displayed content according to an embodiment of the present disclosure.

In an optional embodiment, the first image is the image 1101 as shown in FIG. 11, the to-be-displayed content is the display content 1401 as shown in FIG. 14, wherein the display content 1401 includes the first text display region 1402, the second image region 1203, and the second text display region 1404, the content in the second image region 1203 is identical to the content in the image 1101, the content of the first text display region 1402 and the content of the second text display region 1404 are additional display content, and the content of the first text display region 1402 and the content of the second text display region 1404 are associated with the content of the image 1101.

Figure 15:
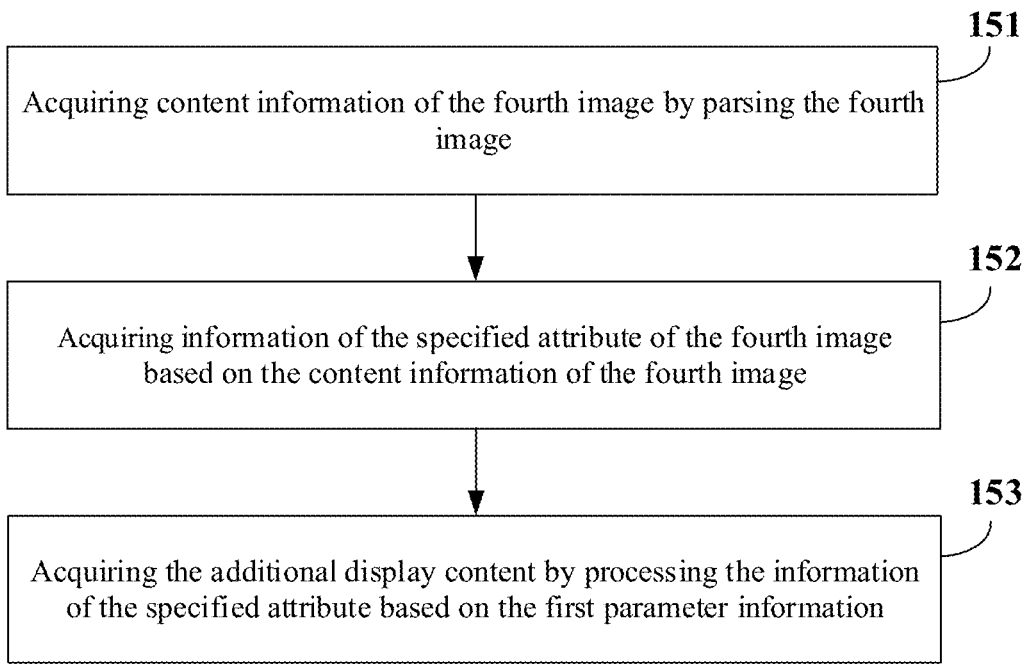
FIG. 15 is a flowchart illustrating another method for sharing content according to an embodiment of the present disclosure.

In an embodiment of the present disclosure, as shown in FIG. 15, step 122 described above may include the following steps 151 to 153.

In step 151, the content information of the fourth image is acquired by parsing the fourth image.

In step 152, the information of the specified attribute of the fourth image is acquired based on the content information of the fourth image.

In step 153, the additional display content is acquired by processing the information of the specified attribute based on the first parameter information.

In an embodiment of the present disclosure, the fourth image may be parsed to acquire the content information of the fourth image, and the content information of the fourth image, for example, may be the name of the image: "The Last Iceberg."

In an embodiment of the present disclosure, the information of the specified attribute of the fourth image may be acquired by searching the information on the internet based on the acquired content information to acquire the additional display content. The information of the specified attribute may be, for example, author name, author autobiography, author introduction, creation context, creation time, and the like. The specified attribute may be predefined or may be defined by the user.

In an embodiment of the present disclosure, the information of the specified attribute of the fourth image may be acquired based on the content information of the fourth image, and then the information of the specified attribute is processed based on the first parameter information to acquire the additional display content. For example, the information of the specified attribute of the acquired fourth image may be filtered, edited, based on the first parameter information to acquire the additional display content.

In an embodiment of the present disclosure, the content information of the fourth image may be acquired by parsing the fourth image, and the information of the specified attribute of the fourth image may be acquired based on the first parameter information and the content information, such that the additional display content is acquired. In this way, the first display device may not only display in a full screen fashion, but also display additional text content, which helps the viewer understand the content of the painting and improves the user experience.

Figure 16:
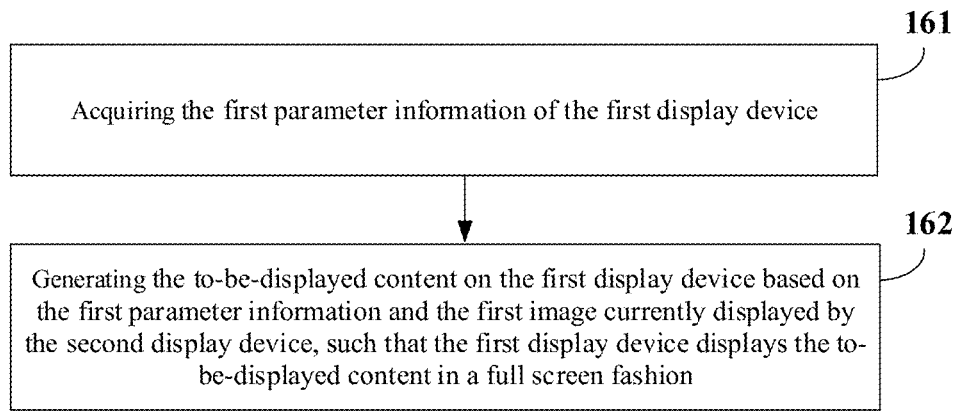
FIG. 16 is a flowchart illustrating a method for processing images according to an embodiment of the present disclosure.

An embodiment of the present disclosure provides a method for processing images. The method is applicable to an electronic device, wherein the electronic device may be a painting screen device, a server, a user terminal, or the like. As shown in FIG. 16, the method includes the following steps 161 to 162.

In step 161, first parameter information of a first display device is acquired.

Exemplarily, the first parameter information is configured to determine a screen aspect ratio of the first display device.

In step 162, to-be-displayed content on the first display device is generated based on the first parameter information and a first image currently displayed by the second display device, such that the first display device displays the to-be-displayed content in a full screen fashion.

Exemplarily, an aspect ratio of the to-be-displayed content is consistent with the screen aspect ratio of the first display device.

Steps 161 and 162 in this embodiment are similar to steps 110 and 120 described above, which are not described herein any further.

In an embodiment, step 162 may include steps 341 to 343 as shown in FIG. 4.

In another embodiment, step 162 may be performed by the following steps: first, receiving a select operation for the first image, then, determining a region of interest of the operation object based on the select operation, then, extracting the region of interest in the first image to acquire a third image, and then processing the third image based on the first parameter information to acquire the content of the first display device to be displayed. In this embodiment, the method for acquiring the to-be-displayed content is similar to steps 613 to 616 in the embodiment shown in FIG. 6, which is not described herein any further.

In an embodiment, the to-be-displayed content includes at least part of the first image.

In an embodiment, the to-be-displayed content is part of the first image or the first image, the first parameter information includes a screen aspect ratio of the first display device, and the aspect ratio of the to-be-displayed content is consistent with the screen aspect ratio.

In another embodiment, the to-be-displayed content includes at least part of the first image and additional display content associated with the content of the first image, wherein the first parameter information carries a screen aspect ratio of a first display device, and an aspect ratio of a display region of the to-be-displayed content is consistent with the screen aspect ratio.

In an embodiment, step 162 may include steps 121 to 123 as shown in FIG. 13.

In an embodiment, step 122 may include the following steps: first, acquiring a user identifier of the first display device, then, determining a target user portrait from the user identifier and a corresponding relationship between the user identifier and the user portrait, and then acquiring the additional display content from the fourth image based on the first parameter information, the target user portrait, and the fourth image. The content of this embodiment is similar to those of the embodiments as described above, which is not described herein any further.

In another embodiment, step 122 may include steps 151 to 153 as shown in FIG. 15.

In an embodiment, acquiring the to-be-displayed content of the first display device based on the first parameter information of the first display device by acquiring the first parameter information of the first display device, such that the first display device displays the to-be-displayed content in a full screen fashion. In this way, the display content may be shared between display devices, display space waste may be avoided, the utilization rate of the display space may be improved, and the display effect may be improved.

An embodiment of the present disclosure provides a device for processing images. The device includes a processor and a memory, wherein the memory is configured to store a computer program, and the processor is configured to run the computer program stored in the memory to perform the method for processing images according to any one of the embodiments as described above.

An embodiment of the present disclosure provides a computer-readable storage medium. The storage medium stores a computer program, wherein the computer program, when run by a processor, causes the processor to perform the method according to any one of the above embodiments.

An embodiment of the present disclosure provides a terminal device. The device includes a processor and a memory, wherein the memory is configured to store a computer program, and the processor is configured to run the computer program stored in the memory to perform the method for sharing content according to any one of the embodiments as described above.

An embodiment of the present disclosure provides a computer-readable storage medium. The storage medium stores a computer program, wherein the computer program, when run by a processor, causes the processor to perform the method for sharing content according to any one of the embodiments as described above.

With respect to the device in the above embodiments, the specific manner in which the processor performs the operation has been described in detail in the embodiments of the method, and will not be elaborated in detail herein.

Figure 17:
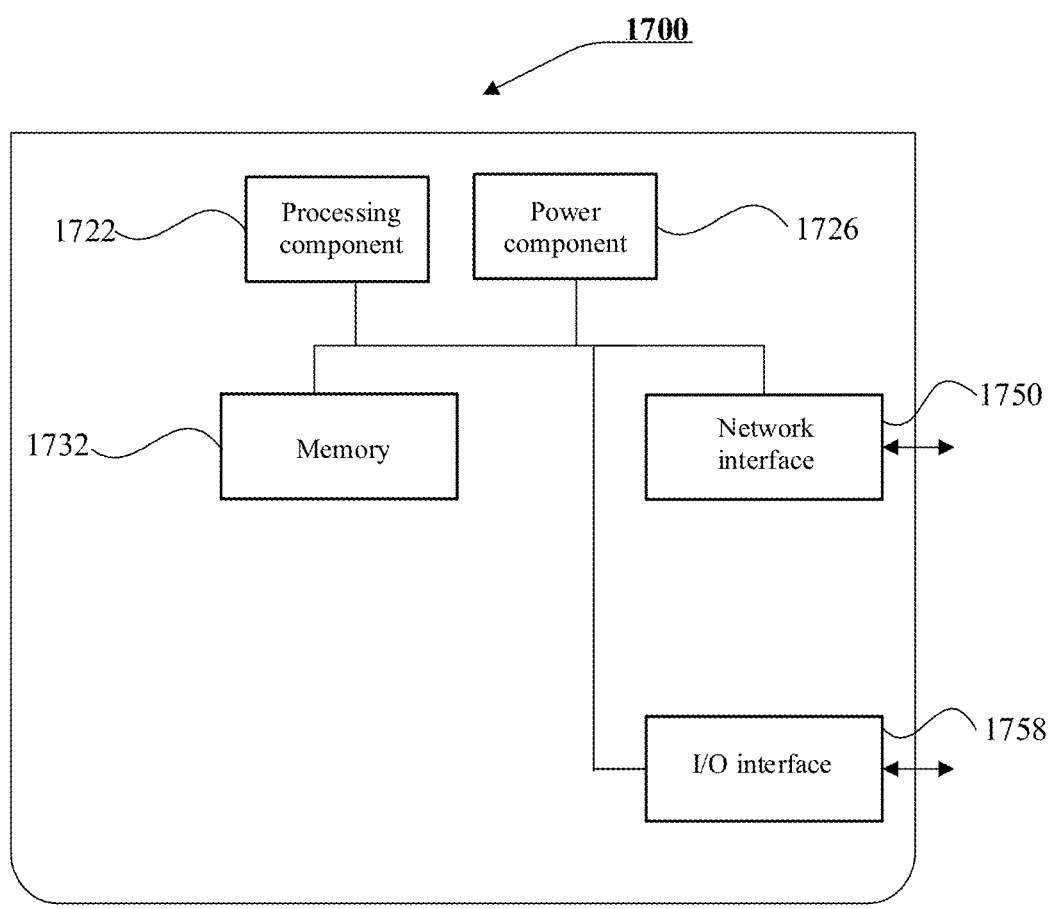
FIG. 17 is a schematic structural diagram illustrating an electronic device according to an embodiment of the present disclosure.

FIG. 17 is a schematic structural diagram illustrating an electronic device according to an embodiment of the present disclosure. For example, the electronic device 1700 may be provided as a server, in other examples, as a display device, or as a user terminal. With reference to FIG. 17, device 1700 includes a processing component 1722 which further includes one or more processors, and memory resources represented by the memory 1732 for storing instructions, for example, applications, that are executable by processing component 1722. The applications stored in memory 1732 may include one or more modules each corresponding to a set of instructions. Furthermore, the processing component 1722 is configured to execute the instructions to perform the method for sharing content or the method for processing images.

The device 1700 may also include a power component 1726 configured to perform power management for the device 1700, wherein a wired or wireless network interface 1750 is configured to connect the device 1700 to a network, and an input output (I/O) interface 1758. Device 1700 may operate the system stored in memory 1732, such as Windows Server™, Mac OS X™, Unix™, Linux™, FreeBSD™, or the like.

In an exemplary embodiment, a non-transitory computer readable storage medium including instructions, for example, a memory 1732 including instructions executable by the processing component 1722 of the device 1700 is provided to perform the methods described above. For example, the non-transitory computer readable storage medium may be a read-only memory (ROM), a random-access memory (RAM), a compact disc read-only memory (CD-ROM), a magnetic tape, a floppy disk, an optical data storage device, or the like.

In the embodiments of the present disclosure, the terms "first" and "second" are only used for descriptive purposes, and cannot be understood as indicating or implying any relative importance. The term "plurality" refers to two or more, unless defined otherwise.

Those skilled in the art will easily think of other embodiments of the present disclosure after considering the specification and practicing the disclosure disclosed herein. The present disclosure is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The description and the embodiments are to be regarded as exemplary only, and the true scope and spirit of the present disclosure are pointed out by the following claims.

It should be understood that the present disclosure is not limited to the precise structures that have been described above and shown in the drawings, and various modifications and changes may be made without departing from its scope. The scope of the present disclosure is only subject to the appended claims.

What is claimed is:
1. A method for processing images, comprising:
    acquiring first parameter information of a first display device, wherein the first parameter information is configured to determine a screen aspect ratio of the first display device;
    acquiring a first image currently displayed by a second display device;
    generating to-be-displayed content of the first display device based on the first parameter information and the first image, such that an aspect ratio of the to-be-displayed content is consistent with the screen aspect ratio; and
    displaying the to-be-displayed content by the first display device in a full screen fashion; and
    wherein the to-be-displayed content is the first image or part of the first image; and
    wherein the to-be-displayed content further comprises additional image display content associated with the content of the first image, and an aspect ratio of a display region of the to-be-displayed content is consistent with the screen aspect ratio; and wherein the generating the to-be-displayed content of the first display device based on the first parameter information and the first image comprises:

acquiring a fourth image by extracting at least part of the first image;

acquiring content information of the fourth image by parsing the fourth image;

acquiring the additional image display content according to the content information; and acquiring the to-be-displayed content by merging the fourth image with the additional image display content.

2. The method according to claim 1, wherein generating the to-be-displayed content of the first display device based on the first parameter information and the first image comprises:

acquiring a first region parameter;

extracting a second image from the first image based on the first region parameter, wherein the first region parameter is configured to determine a position of content of the second image in the first image; and acquiring the content to-be-displayed by processing the second image based on the first parameter information.

3. The method according to claim 1, wherein generating the to-be-displayed content of the first display device based on the first parameter information and the first image comprises:

determining a region of interest in the first image in response to a select operation on the first image;

acquiring a third image by extracting the region of interest from the first image; and acquiring the to-be-displayed content by processing the third image based on the first parameter information.

4. The method according to claim 1, wherein acquiring the additional image display content based on the first parameter information and the content of the fourth image comprises one of:

acquiring a user identifier of the first display device;

determining a target user portrait based on the user identifier and a corresponding relationship between the user identifier and a user portrait; and acquiring the additional image display content based on the first parameter information, the target user portrait, and the fourth image;

or, acquiring the content information of the fourth image by parsing the fourth image;

acquiring information of a specified attribute of the fourth image based on the content information; and acquiring the additional image display content by processing the information of the specified attribute based on the first parameter information.

5. The method according to claim 1, wherein the first parameter information is the screen aspect ratio or a screen resolution of the first display device.

6. A device for processing images, comprising a processor and a memory; wherein the memory is configured to store a computer program; and the processor is configured to run the computer program stored in the memory to perform the method as defined in claim 1.

7. The method according to claim 1, wherein the generating the to-be-displayed content of the first display device based on the first parameter information and the first image comprises:

determining the first image as the to-be-displayed content, in the case that the aspect ratio of the first image is consistent with the screen aspect ratio; and cropping a part content from the first image as the to-be-displayed content, in the case that the aspect ratio of the first image is inconsistent with the screen aspect ratio, such that the aspect ratio of the to-be-displayed content is consistent with the screen aspect ratio.

8. A method for sharing content, applicable to a second display device, the method comprising:

acquiring first parameter information of a first display device, wherein the first parameter information is configured to determine a screen aspect ratio of the first display device;

generating to-be-displayed content of the first display device based on the first parameter information and a first image currently displayed by a second display device, such that an aspect ratio of the to-be-displayed content is consistent with the screen aspect ratio; and sending the to-be-displayed content to the first display device, such that the first display device displays the to-be-displayed content on in a full screen fashion; and wherein the to-be-displayed content is the first image or part of the first image; and wherein the to-be-displayed content further comprises additional image display content associated with the content of the first image, and an aspect ratio of a display region of the to-be-displayed content is consistent with the screen aspect ratio; and wherein the generating the to-be-displayed content of the first display device based on the first parameter information and the first image comprises:

acquiring a fourth image by extracting at least part of the first image;

acquiring content information of the fourth image by parsing the fourth image;

acquiring the additional image display content according to the content information; and acquiring the to-be-displayed content by merging the fourth image with the additional image display content.

9. The method according to claim 8, further comprising:

establishing a communication connection to the first display device by establishing a direct communication to the first display device using a Universal Plug and Play communication protocol or a Bluetooth communication protocol, in the case that the first display device is detected.

10. The method according to claim 8, wherein acquiring the first parameter information of the first display device comprises:

sending a first request to the first display device, wherein the first request is configured to acquire a second parameter information, the second parameter information comprising the first parameter information;

receiving first feedback information from the first display device in response to the first request, wherein the first feedback information comprises the second parameter information; and acquiring the first parameter information based on the second parameter information.

11. A terminal device, comprising a processor and a memory; wherein the memory is configured to store a computer program; and the processor is configured to run the computer program stored in the memory to perform the method as defined in claim 8.

12. The method according to claim 8, wherein the generating the to-be-displayed content of the first display device based on the first parameter information and the first image comprises:

determining the first image as the to-be-displayed content, in the case that the aspect ratio of the first image is consistent with the screen aspect ratio; and cropping a part content from the first image as the to-be-displayed content, in the case that the aspect ratio of the first image is inconsistent with the screen aspect ratio, such that the aspect ratio of the to-be-displayed content is consistent with the screen aspect ratio.

13. A method for sharing content, applicable to a server, the method comprising:

acquiring first parameter information of a first display device, wherein the first parameter information is configured to determine a screen aspect ratio of the first display device;

acquiring a first image currently displayed by a second display device;

generating to-be-displayed content of the first display device based on the first parameter information and the first image, such that an aspect ratio of the to-be-displayed content is consistent with the screen aspect ratio; and controlling the first display device to display the to-be-displayed content in a full screen fashion; and wherein the to-be-displayed content is the first image or part of the first image; and wherein the to-be-displayed content further comprises additional image display content associated with the content of the first image, and an aspect ratio of a display region of the to-be-displayed content is consistent with the screen aspect ratio; and wherein the generating the to-be-displayed content of the first display device based on the first parameter information and the first image comprises:

acquiring a fourth image by extracting at least part of the first image;

acquiring content information of the fourth image by parsing the fourth image;

acquiring the additional image display content according to the content information; and acquiring the to-be-displayed content by merging the fourth image with the additional image display content.

14. The method according to claim 13, further comprising:

establishing a communication connection between the first display device and the second display device by:

receiving a first register request from the first display device, wherein the first register request comprises a first device identifier of the first display device;

registering the first display device in response to the first register request and sending second feedback information to the first display device, wherein the second feedback information comprises a first registration result;

receiving a second register request from the second display device, wherein the second register request comprises a second device identifier of the second display device; and registering the second display device in response to the second register request, and sending third feedback information to the second display device, wherein the third feedback information comprises a second registration result, and the first display device and the second display device are capable of communicating with each other via the server in the case that the first display device and the second display device are successfully registered with the server.

15. The method according to claim 14, wherein upon establishing the communication connection between the first display device and the second display device, the method further comprises:

receiving a first create request from the first display device, wherein the first create request comprises the first device identifier and second parameter information of the first display device, the second parameter information comprising the first parameter information; and associating the first device identifier with the second parameter information and storing both of them in response to receiving the first create request.

16. The method according to claim 15, wherein acquiring the first parameter information of the first display device comprises:

receiving a content create request from the second display device, wherein the content create request is configured to request to share the first image with the first display device, the content create request comprising the first device identifier of the first display device, acquiring the second parameter information based on the first device identifier and acquiring the first parameter information based on the second parameter information.

17. An electronic device, comprising a processor and a memory;

wherein
the memory is configured to store a computer program; and
the processor is configured to run the computer program stored in the memory to perform the method as defined in claim 13.

18. The method according to claim 13, wherein the generating the to-be-displayed content of the first display device based on the first parameter information and the first image comprises:

determining the first image as the to-be-displayed content, in the case that the aspect ratio of the first image is consistent with the screen aspect ratio; and cropping a part content from the first image as the to-be-displayed content, in the case that the aspect ratio of the first image is inconsistent with the screen aspect ratio, such that the aspect ratio of the to-be-displayed content is consistent with the screen aspect ratio.

* * * * *

UNITED STATES PATENT AND TRADEMARK OFFICE
CERTIFICATE OF CORRECTION

PATENT NO. : 12,073,810 B2
APPLICATION NO. : 17/635743
DATED : August 27, 2024
INVENTOR(S) : Junjie Zhao Page 1 of 1

It is certified that error appears in the above-identified patent and that said Letters Patent is hereby corrected as shown below:

On the Title Page

The Assignee field should appear as:
(73) Assignees: BEIJING BOE TECHNOLOGY DEVELOPMENT CO., LTD., Beijing (CN); BOE TECHNOLOGY GROUP CO., LTD., Beijing (CN)

Signed and Sealed this
Fifth Day of August, 2025

Coke Morgan Stewart
*Acting Director of the United States Patent and Trademark Office*